(No Model.)  8 Sheets—Sheet 1.

L. H. DAVIS.
SEWING MACHINE.

No. 262,536.  Patented Aug. 8, 1882.

Fig. 1.

Witnesses.
Robert Everett.
J. A. Rutherford

Inventor.
Levis H. Davis.
By James L. Norris,
Atty.

(No Model.) 8 Sheets—Sheet 2.

L. H. DAVIS.
SEWING MACHINE.

No. 262,536. Patented Aug. 8, 1882.

Witnesses,
Robert Everett
J. A. Rutherford

Inventor,
Levis H. Davis.
By James L. Norris.
Atty.

(No Model.)   8 Sheets—Sheet 3.

L. H. DAVIS.
SEWING MACHINE.

No. 262,536.   Patented Aug. 8, 1882.

Witnesses.
Robert Everett.
J. A. Rutherford

Inventor:
Levis H. Davis.
By James L. Norris,
Atty.

N. PETERS, Photo-Lithographer, Washington, D. C.

(No Model.)  8 Sheets—Sheet 4.

L. H. DAVIS.
SEWING MACHINE.

No. 262,536.  Patented Aug. 8, 1882.

Witnesses.
Robert Everett
J. A. Rutherford

Inventor.
Levis H. Davis.
By James L. Norris.
Atty.

(No Model.)
8 Sheets—Sheet 6.

L. H. DAVIS.
SEWING MACHINE.

No. 262,536. Patented Aug. 8, 1882.

Witnesses,
Robert Everett
J. A. Rutherford

Inventor:
Levis H. Davis.
By James L. Norris.
Atty.

(No Model.) 8 Sheets—Sheet 8.

L. H. DAVIS.
SEWING MACHINE.

No. 262,536. Patented Aug. 8, 1882.

Witnesses.
Robert Everett,
J. A. Rutherford

Inventor.
Levis H. Davis.
By James L. Norris.
Atty.

UNITED STATES PATENT OFFICE.

LEVIS H. DAVIS, OF WEST CHESTER, PENNSYLVANIA.

SEWING-MACHINE.

SPECIFICATION forming part of Letters Patent No. 262,536, dated August 8, 1882.

Application filed May 25, 1882. (No model.)

*To all whom it may concern:*

Be it known that I, LEVIS H. DAVIS, a citizen of the United States, residing at West Chester, Chester county, Pennsylvania, have invented new and useful Improvements in Sewing-Machines, of which the following is a specification.

This invention relates to an improvement upon the sewing-machine for which Letters Patent of the United States No. 236,788 were granted to me on the 18th day of January, 1881.

The objects of my present invention are to provide novel means for imparting a variable movement to the shuttle from the driving-shaft, to cause the forward movement of the shuttle and the upward movement of the needle to cease at the same instant, to cause the needle and shuttle to simultaneously commence their reverse movements, to decrease the speed of the shuttle while the needle takes the loop from the heel of the shuttle, to increase the speed of the shuttle to complete the stitch, to prevent lost motion of the shuttle-operating devices, to clamp the shuttle at either extreme of the raceway and hold the shuttle loosely at the point where the thread is taken over it, to provide novel means for supporting the bed-plate in an elevated position, and for holding the same in its lowered or horizontal position. These objects I attain by means of the devices illustrated in the annexed drawings, in which—

Figures 9, 10:
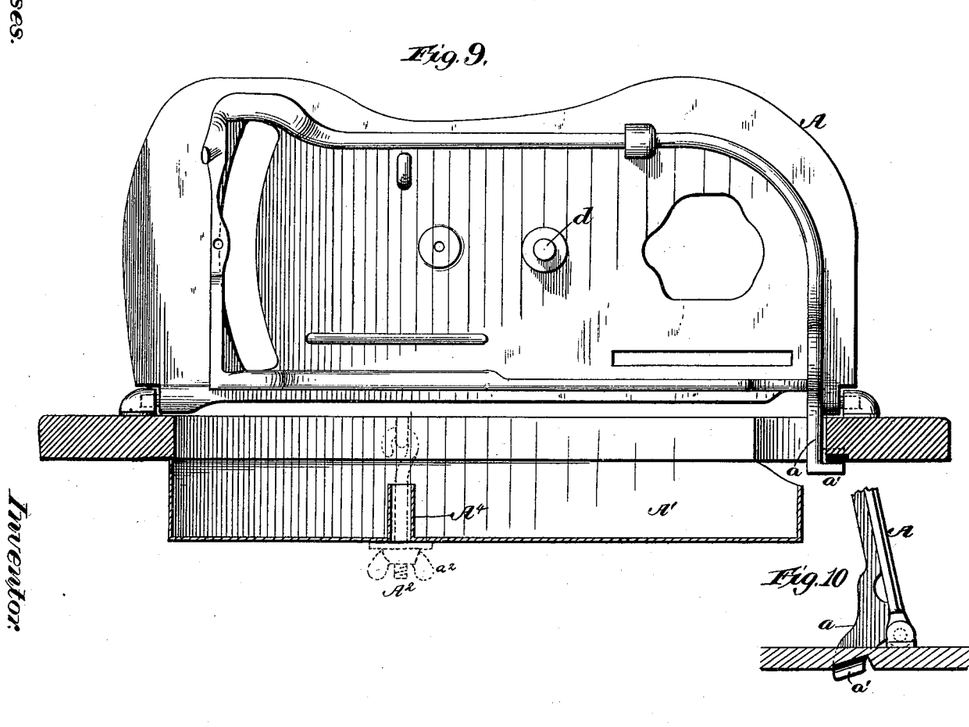
Fig. 9 is a section through the grease or drip pan, and shows the hinged bed-plate raised.
Fig. 10 is a detail sectional view of a portion of the bed-plate, and shows the lug for holding the same in an upright position.

The letter A indicates the bed-plate, which is hinged upon its supporting stand or table, so that it can be tilted up in order to allow access both to the operative devices carried upon the under side and to the grease or drip pan A', which is secured below an opening in the table. To check the bed-plate after it has been raised, and to maintain it in a vertical or substantially vertical position, as indicated in Fig. 9, I cast or provide the bed-plate, preferably near one of its hinge-corners, with a pendent arm, $a$, having a laterally-projecting lug, $a'$, which, after the bed-plate has been raised, as shown, catches the under side of the table, and thus holds the bed-plate in proper raised or tilted position. The bed-plate is held down in place upon the table by means of a hook-bolt, $A^2$, which passes through a short tube, $A^4$, in the bottom of the grease-pan and engages an eye upon the under side of the bed-plate. Upon the lower screw-threaded end of said bolt is a thumb-nut, $a^2$, to be tightened up against the drip-pan, a suitable washer being located upon the bolt between the pan and nut. Elastic washers $a^3$ are arranged on the bolts which secure the drip-pan to the table, said washers being located both above and below the ears or flanges $a^4$, through which the bolts pass, and elastic cushions $a$ are secured upon the table for the bed-plate to rest upon. The above-described arrangement of cushions and washers serves to deaden the noise occasioned by jarring during the operation of the machine.

The driving-shaft B passes through the goose-neck $A^3$, which is cast in one piece and made flaring at its front end to form the head, and it is provided at its rear end with a screw-threaded opening to receive the removable bearing $b$, as in my former patented machine. The rear portion of the driving-shaft is also formed with a crank-bend, B′, and to the rear there is fitted upon the shaft a cam, C, having a sleeve, $c$, which fits within the bearing $b$ and constitutes the journal portion of this end of the shaft. A pair of anti-friction rollers, $B^2 B^2$, are mounted upon an enlargement or collar on the cranked portion of the driving-shaft, the bend of which latter, while being extended laterally sufficiently to give the desired throw, is long and gradual, so that the friction-rollers can be shipped on from the forward end of the shaft.

Figures 11, 12:
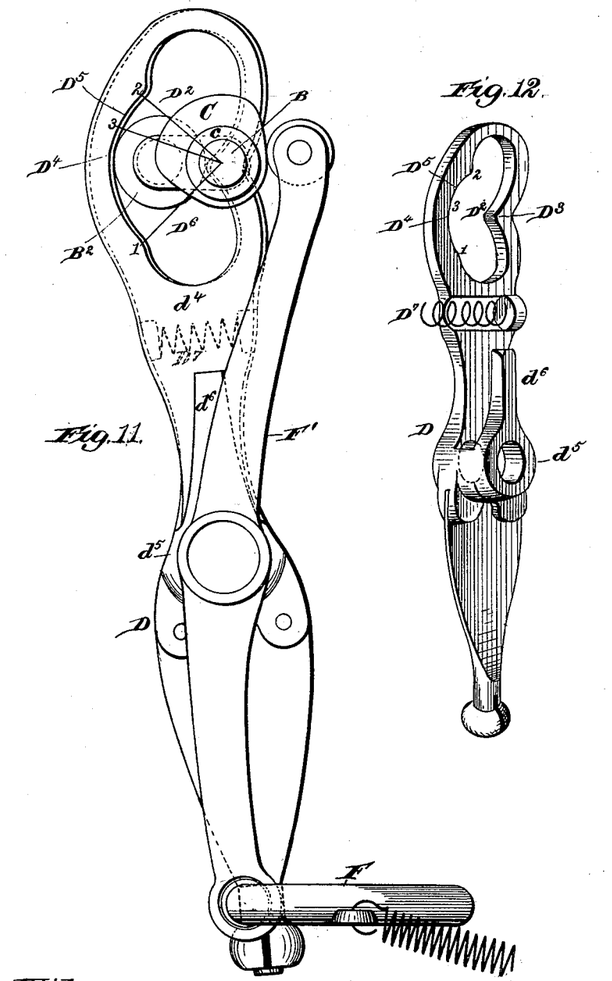
Fig. 11 illustrates the oscillating lever and auxiliary devices for operating the shuttle-lever.
Fig. 12 shows the same on a reduced scale with an attachment removed.
Figure 13:
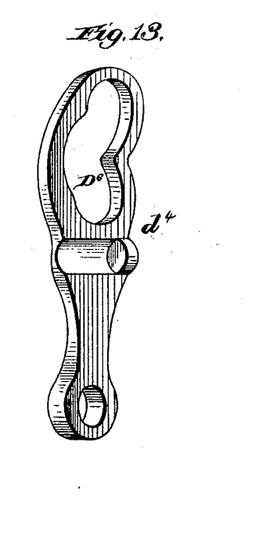
Fig. 13 shows said attachment.

D indicates the oscillating lever through which motion is transmitted from the driving shaft to the horizontal oscillating shuttle-lever D′, pivoted on a pin, $d$, projecting downward from the bed-plate, as usual. This oscillating lever D is pivoted upon a tapering pin, $d'$, which passes through the walls of the vertical portion of the goose-neck, with its screw-threaded end projecting therefrom and provided with a nut, $d^2$, which can be tightened thereon against the goose-neck. The object of making this fulcrum-pin tapering is that it can be advanced and the nut again tightened up, so as to compensate for wear between the lever and the pin, and also between the pin and the lever which is employed for actuating the feed-lever. This oscillatory lever D, which actuates the shuttle-lever, has its lower portion preferably composed of a spring-plate with an adjustable or expansible ball upon its lower end, which fits in a socket formed at one end of the shuttle-lever, as in my former patent. At its upper end the oscillatory lever D is provided with a cam-slot, $D^2$, in which plays one of the friction-rollers, $B^2$, mounted upon the bend of the driving-shaft. This cam-slot, while in many respects similar to that shown in my said patent, has the following point of difference: In said patent that side of the slot opposite the side having the elbow $D^3$ has a curve formed so as to give a continuous decreased or stop motion by reason of the friction-roller traveling in said slot, and will necessarily cause a continuous decreased or stop motion of the shuttle until the reverse movement is obtained; but it will be seen that in the present instance the side $D^4$ opposite the elbow $D^3$ has a defined variable curve which will effect a slow and fast movement of the lever, and hence like movements of the shuttle. Thus, referring to Fig. 11, and taking the shaft B as a center, it will be seen that the radial line 1 from the center of the shaft will be equal or nearly equal in length to the line 3, also taken from the center of the shaft to the side $D^4$ of the slot, thus showing that a regular or nearly regular arc of a circle is obtained between the two lines. The curve then sheers somewhat abruptly inwardly, so that the radius 2 from the shaft to side $D^4$ of the slot will be considerably less than the radius 3 just described. The effect of this irregularly-curved side of the slot is that while the friction-roller is passing upwardly through the slot the lever will move very slowly while the friction-roller is passing around the elbow $D^3$; but as soon as it acts upon that portion $D^5$ of the side $D^4$ of the slot which is substantially between lines 2 and 3, and which sheers somewhat abruptly inwardly, an increased movement will be given to the lever in one direction. As soon as the friction-roller, however, passes the point indicated by line 2 the lever will be oscillated in an opposite direction. As the friction-roll now descends by reason of the crank movement of the driving shaft, the last-named motion of the lever will be maintained until the friction-roller reaches the point of elbow $D^3$. It will then be brought by the continuous movement of the shaft against side $D^4$ of the slot and reverse the movement of the lever, which movement will be continued until the friction-roller has reached the extreme throw of the crank and then reached the point indicated by line 1, after which the movement of the lever will be decreased until the friction-roller reaches the part $D^5$, when a repetition of the accelerated movement first described will take place. This slot is then so shaped and the other devices, presently to be described, so timed that after the roller has just passed upward around elbow $D^3$ the shuttle will have reached the farthest point in its forward movement, and will have drawn tight the lower thread, and at the same time the needle will have ascended to its highest position, and thus both threads will be drawn at the same time to complete the stitch. Now, as the driving-shaft continues to revolve, the roller travels toward the upper end of the slot, and then after the extreme throw of the crank it travels down to the elbow, throwing the shuttle back rapidly to its rearmost position. At this time the needle has descended to its lowest position, and then rises sufficiently to form a loop by the time the point of the shuttle has arrived at the needle, the action of the roller in the slot below the elbow $D^3$ thus operating the lever so as to actuate the shuttle-lever and throw the shuttle partly through the loop, while the needle remains nearly stationary. The movement of the shuttle is then decreased as the friction-roller passes up over the side $D^4$ of the slot between points 1 and 3, while the needle rises and takes the loop over the shuttle while the latter remains in this partly-suspended movement. The roller then, acting in the slot against part $D^5$, causes the motion of the shuttle to be increased, so that the needle and the shuttle will arrive at their extreme points simultaneously. Their motions are then reversed at the same instant and the operation repeated. It will thus be seen that on its forward movement the shuttle has a continuous movement at different rates of speed—first, at its ordinary rate of speed, next a decreased rate of speed while the needle rises and takes the loop off its heel, and then an increased movement, so as to reach its farthest return point at the same time that the needle has reached its highest point.

As it is essential that the action of the oscillatory lever which actuates the shuttle-lever should be positive, even, and without jar or jolt, and that the friction-roll should at all times be in proper contact with the required side of the slot, I have devised a second clamping-lever, $d^4$, which is acted upon by one of the rollers $B^2$, and operates in conjunction with the main lever so as to produce the desired result. To such end I form the lever D with a hub, $d^5$, which fits upon the pin $d'$, and has a short radial arm, $d^6$. The lever $d^4$ is mounted upon the pin $d'$, or a separate fulcrum, and is received in a recess in said hub, in which it has a limited play. This part or lever $d^4$ has a slot, $D^6$, formed similarly to the slot of the main lever D, the two levers being normally held in the position indicated by full and dotted lines, Fig. 11, by means of a spring, $D^7$, located in a recess formed by channels in the opposing faces of the two levers, and having its ends fitted against abutments respectively located at one end of each channel. Hence, since this spring tends to throw one lever slightly past the other, the friction-roll will at all times be in contact with one side of the slot in the oscillatory lever. At the same time that side of the slot in the second lever which is opposite will bear and bind against the roller with a yielding pressure.

Figure 14:
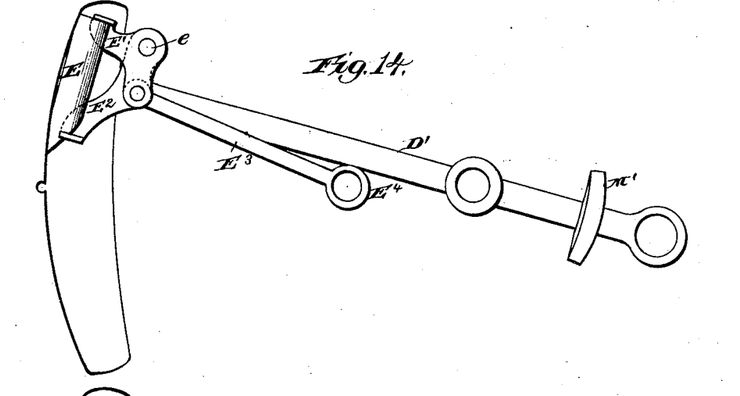
Fig. 14 illustrates the shuttle-lever and shuttle-carrier.
Figure 15:
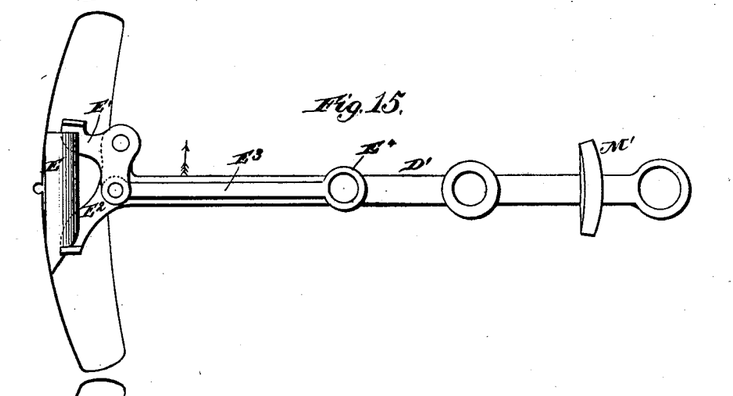
Figs. 15 and 16 illustrate the same in different positions.
Figure 16:
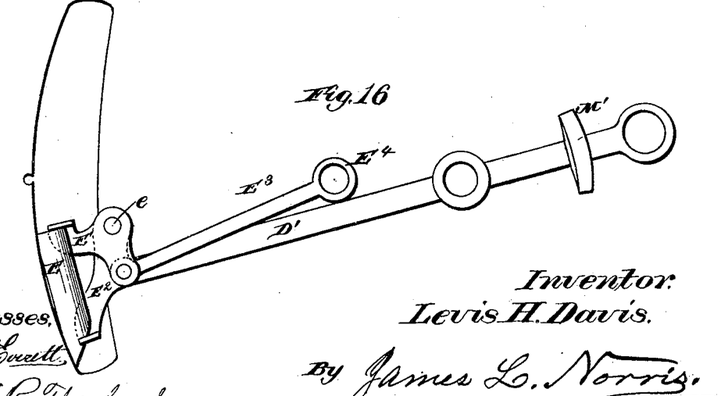
Figures 17, 18, 19:
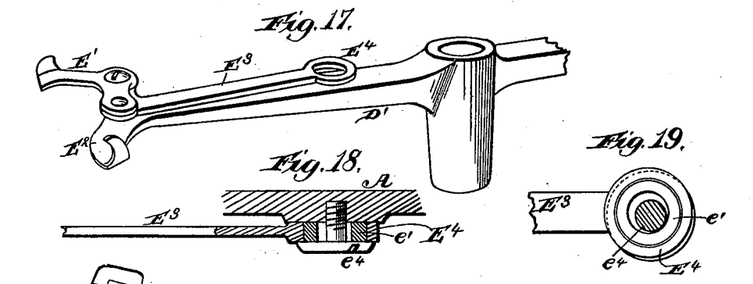
Fig. 17 is a perspective view of the devices shown in the three preceding figures.
Fig. 18 is a detail sectional view, showing the means for shifting the pivotal center of the lever which causes the shuttle carrier to automatically grip and release the shuttle.
Fig. 19 is a plan view of the under side of Fig. 18.

It is necessary that the shuttle should be loosely retained by the carrier while the thread is passing over the shuttle, and also that as the shuttle approaches either end of its path it should be gradually gripped by the carrier, so as to prevent its being thrown to the end of the carrier. This object I attain by means of the devices illustrated in Figs. 14 to 22, both inclusive. Figs. 14, 15, and 16 illustrate one mode of attaining this result. In these figures E indicates the shuttle, which is beveled at its point, as usual. The carrier is composed of two jaws connected together by a pivot, $e$, the jaw $E'$ being adapted to fit under and against the heel of the shuttle, and the jaw $E^2$, which is rigid with the shuttle-lever, being adapted to fit over a portion of the point of the shuttle. The jaw $E'$, which is pivoted upon an arm of the remaining jaw, has two arms, one being adapted to hold the shuttle and the other being connected to a short lever, $E^3$, which is pivoted to the under side of the bed-plate. Fig. 15 shows the shuttle in position for taking the thread over the shuttle, the jaws being opened so that the carrier will hold the shuttle loosely. It will be seen that the lever $E^3$ is pivoted at such point that when the shuttle-lever is brought into this position the greatest freedom is given to the shuttle. Both arms are then parallel, or nearly so, to each other, and when in this position the needle-thread is passing over the shuttle. A vibration, however, to the right or to the left of the longer arm of the shuttle-lever $D'$ brings the two levers to an angle with each other, causing the short lever $E^3$, which is incapable of traversing the path described by the longer lever, to pull upon one arm of the jaw $E'$, thus closing its other arm against the heel of the shuttle and causing the latter to be clamped between the two jaws. Figs. 14 and 16 illustrate the shuttle thus held rigidly by the carrier-jaws, while the intermediate figure illustrates the shuttle retained loosely between the carrier-jaws. In Fig. 17 the devices just described are shown in perspective, the holding ends of the jaws being more clearly illustrated in this figure.

Figs. 18 and 19 illustrate the way in which the short lever $E^3$ is pivoted to the under side of the bed-plate. It may happen that the short lever is not in the first instance pivoted in the exact position required. To render, therefore, its pivotal point adjustable, I provide its inner end with a ring, $E^4$, and within this ring I fit a ring, $e'$, through which the screw $e^4$ passes, the screw-head binding solely upon the inner ring and the screw-shank entering the bed-plate. Hence the ring $E^4$ of the lever turns about the inner ring, which forms a pivot for the lever. To adjust the pivotal point, loosen the screw, shift the rings, and then tighten up the screw-head upon the inner ring so as to clamp it rigidly upon the bed-plate. Fig. 18 shows the screw passing centrally through the inner ring, and Fig. 19 the screw passing through the same to one side of the center, the rings having been shifted for the purpose already described.

Figure 20:
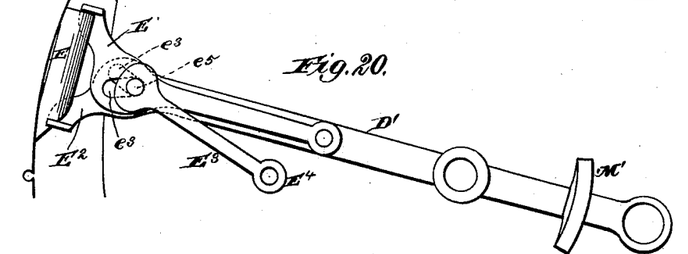
Figs. 20, 21, and 22 illustrate modifications of the devices for automatically operating the shuttle-carrier.
Figure 21:
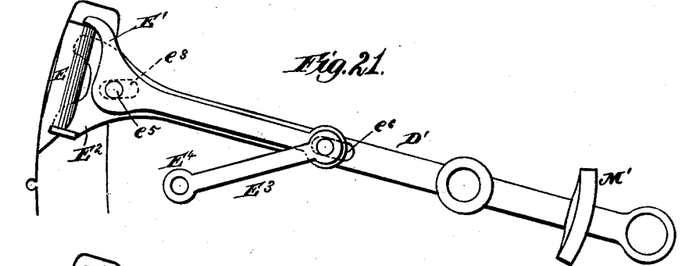
Figure 22:
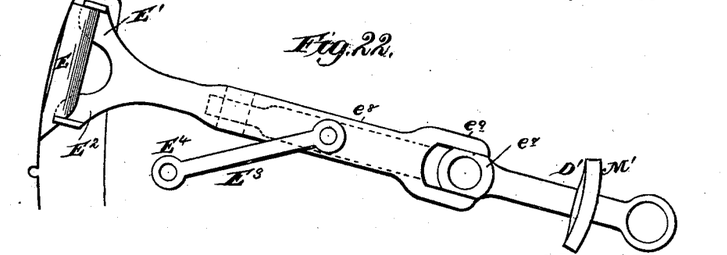

Figs. 20, 21, and 22 exhibit modifications, like results, however, being attained in all of these instances.

In Fig. 20 the clamping-arm of the jaw $E'$ is formed as before, while its inner arm, which is considerably elongated, is pivoted to the shuttle-lever $D'$. The two jaws $E' E^2$ are each provided with a diagonal slot, $e^3$, that of the jaw $e^2$ being shown in dotted lines. The short lever $E^3$, which is pivoted to the bed-plate, as before, is provided at its free end with a pin, $e^5$, which is received in the slots of these jaws. When the shuttle-lever has been moved so as to bring the shuttle at either end of its path or race, the pin will pass to the inner ends of the slots, as shown, and, drawing upon the jaw $E'$ at the inner end of its slot, will close the same upon the shuttle, since it will, so to speak, pull upon the jaw at a point between its free and its pivotal end. When, however, the shuttle-lever is moved so as to bring the two levers parallel and the shuttle in position for passing through the loop of the needle-thread, the pin will necessarily enter the opposite ends of the slots, which said ends will now be brought into coincidence by the pin, and hence the jaw E will be moved away from the shuttle. Thus, as in Fig. 20, the two inner ends of the diverging slots meet, while when the levers are parallel the outer ends meet and the divergence of the slots from each other will be reversed.

In Fig. 21 the jaw $E^2$, which is rigid with the lever D', is provided with a slight extension, which extends under the shuttle. The jaw E' has its inner end extended some distance back along the lever D', and at its inner end is pivotally connected to the short arm $E^3$ by a pin which enters a slot, $e^6$, in the shuttle-lever D'. The jaw $E^2$ is also provided with a diagonal slot, $e^3$, into which a pin, $e^5$, that is fixed upon the jaw E', is received. As the shuttle-lever is vibrated and the two levers moved into or out of parallelism the short lever will move the jaw E' back and forth, and the pin $e^5$, acting upon the inclined walls of the slot $e^3$ of the jaw $E^2$, will cause it to bind upon or release the shuttle, as the case may be.

In Fig. 22 the two jaws of the carrier are rigid with each other and with the outer arm of the shuttle-lever, which is slidably connected to the inner arm as follows: The hub $e^7$ is flattened at two sides, and the outer section, $e^8$, of the lever D' has at its inner end a fork, $e^9$, which embraces the flat sides of the hub. An extension (shown in dotted lines) extends under the section $e^8$ and passes between said section or outer arm and a piece shown in transverse dotted lines. The short arm $E^3$ is pivoted to the bed-plate and also to the outer arm or section of the lever D'. Hence as the lever D' is vibrated the outer arm, carrying the jaws, will be moved out so as to embrace and hold the shuttle when the shuttle-lever is moved so as to bring the shuttle to either end of its path, and the said arm and jaws will be moved in toward the hub when the levers are brought parallel and the shuttle is held loosely for allowing the thread to be taken over it.

In all these instances it will be seen that the result is dependent principally upon the two levers and the subordinate mechanism described. The feed-lever F is operated by an oscillatory lever, F', which is mounted upon the pin d' and actuated at the proper intervals by cam C upon the driving-shaft. This feed-lever operates in the same way as that set forth in my former patent, and is employed in conjunction with devices for indicating the length of stitch. The feed-lever is grooved along its upper side, and a swivel-block, G, received in said groove is rendered adjustable, so that the throw of the feed-lever can be varied. This adjustment is effected by swiveling the said block to a slide-bar, G', arranged under the bed-plate, and to one end of this bar is fitted a set-screw, $g$, which passes up through a slot, $G^2$, in the bed-plate.

Figures 23, 24, 25, 26, 27:
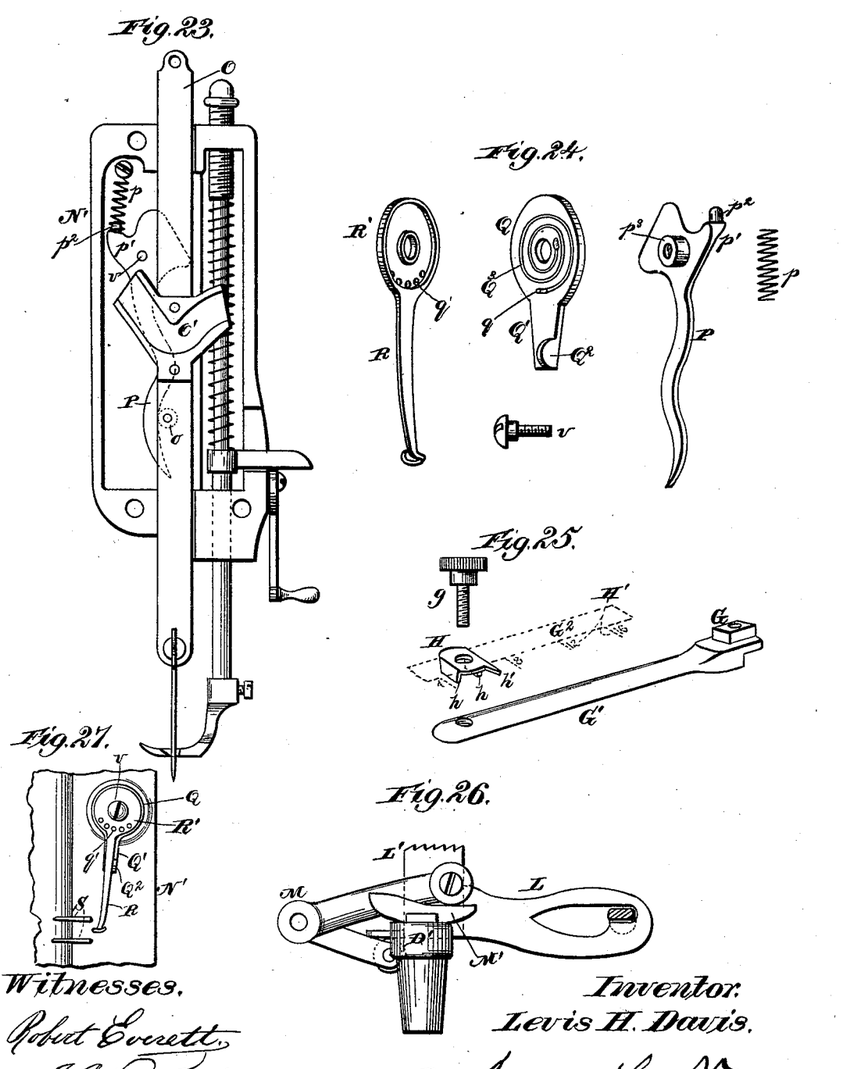
Fig. 23 shows the head with the operative mechanism supported thereby, the base-plate being removed.
Fig. 24 shows in detail the several parts of the take-up mechanism.
Fig. 25 shows in detail the several parts of the stitch-indicator.
Fig. 26 is a detail, showing the feed-dog and its adjuncts.
Fig. 27 shows a portion of the head with the take-up devices.

Referring now to Fig. 25, in which the parts are shown in detail, it will be seen that the bar G' is provided at one end with a perforation for the fulcrum or swivel-pin of the block that is received in the groove of the feed-lever and at its opposite end with a perforation for the set-screw.

Figures 6, 7, 8:
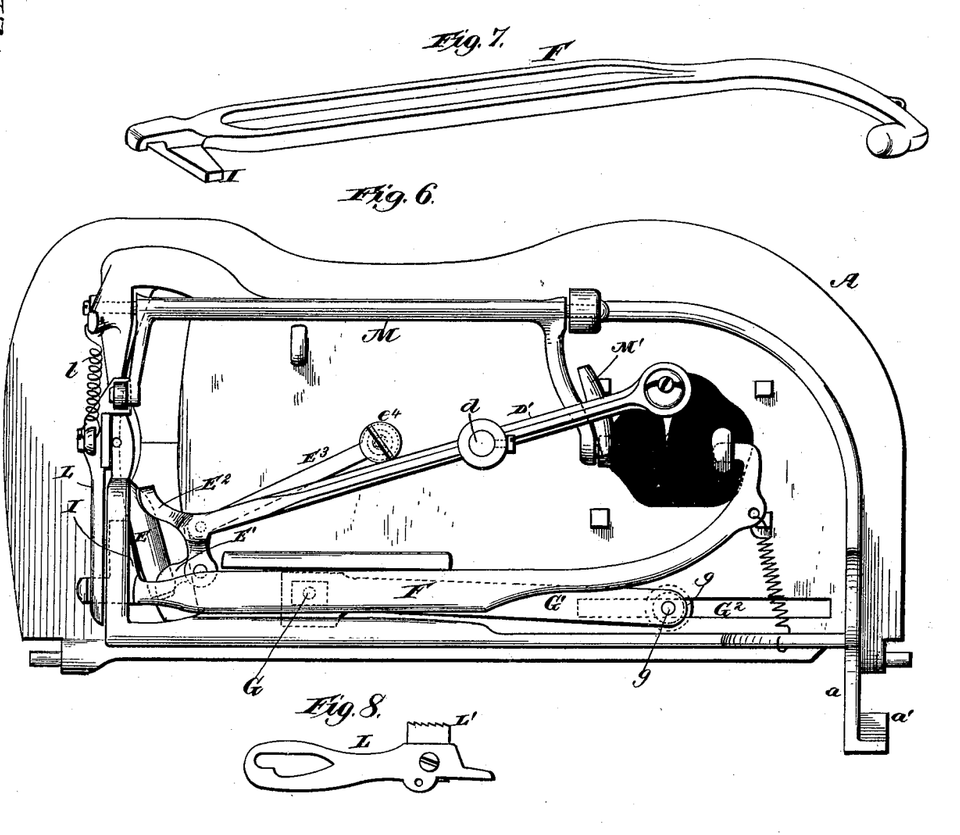
Fig. 6 is a plan view of the under side of the bed-plate with the various operative devices that are arranged thereon.
Fig. 7 is an enlarged view of the feed-lever.
Fig. 8 shows a feed-dog and slotted bar connected therewith.

In adjusting the stitch-indicator, a plate, H, provided with a central perforation, two pendent lugs, $h$, and a pointer, $h'$, will be so arranged that the lugs will enter slot $G^2$ (shown in Fig. 6) and the pointer be directed to a graduated scale, H', that will be arranged upon the top side of the bed-plate alongside of the slot $G^2$. The shank of the set-screw will then be passed through the plate H and screwed into the bar G'. By this means the bar and the fulcrum or swivel-block of the feed-lever can be shifted in the groove at will, so as to make a long or a short stitch, and the set-screw then tightened up so as to hold the parts rigid. The finger or pointer will, in connection with the scale, indicate the length of stitch. The feed-lever, as in my former patent, is provided at its forward end with a lateral projection or feed-steadier, I, which works in a slot in a flange of the bed-plate. The extreme forward end of the feed-lever also extends through a slot in a bar, L, which carries the feed-dog L'. The bar L connects with an arm pendent from the bed-plate by a spiral spring, $l$, which tends to draw the bar backward and downward. M indicates the two-armed rock-shaft for raising the bar L and feed-dog at proper intervals, one arm acting upon the bar, and the remaining arm carrying a friction-roller, which bears upon the cam-face of a cross-bar, M', which is formed upon the rear portion of the shuttle-lever.

N indicates the head, and N' the usual face-plate, which in Fig. 23 is removed in order to show the several operative parts.

Figure 1:
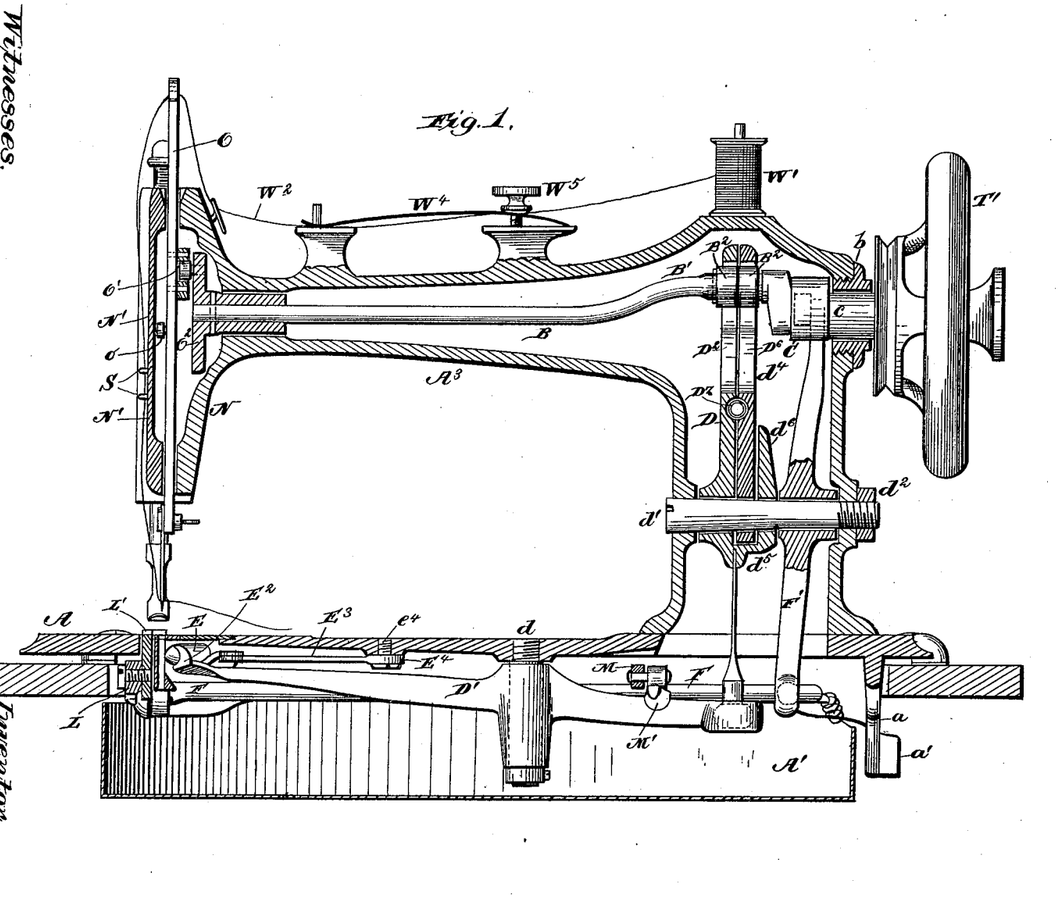
Figure 1 is a vertical longitudinal section of a sewing-machine embodying my invention.

O refers to the needle-bar carrying the cam-grooved cross-head O', in which a small roller upon a wrist-pin plays to give the proper up-and-down movement to the needle-bar. Said wrist-pin projects from the rotary disk $O^2$, which is fixed upon the forward end of the driving-shaft, as shown in Fig. 1. The needle-bar carries a stud, having a small roller, $o$, (seen in dotted lines, Fig. 23,) which, as the needle-bar moves up and down, plays against the irregularly-curved or cam-shaped edge of a pivoted arm, P, which is held against the roller by a spring, $p$, exerting a downward pressure against a side extension, $p'$, of said arm, which is provided with a stud, $p^2$, that enters the lower end of the spring so as to hold the spring in place. It will be seen that in my former patent the roller carried by the needle-bar, in acting against the arm P so as to vibrate the same, caused the spring to be drawn out, so that the retractile energy of the spring served to restore the arm to its normal position; but I have found that by locating the roller upon the needle-bar so as to cause it to compress the spring, which will expand to throw the arm back, a much smoother and better action is obtained. The arm P is provided with a boss, $p^3$, having a screw-hole tapped in its center, and this boss fits into a hole formed through the front plate of the head.

Q indicates a disk, which is provided with an arm, Q′, having at its end a laterally-projecting lip, $Q^2$. This disk also carries a convolute spring, $Q^3$, the inner end of which is secured to the disk, while its outer end, $q$, is left free and bent outwardly, so as to be capable of entering any one of a line of perforations, $q'$, in the disk R′, which carries the take-up arm R. This disk R′, which fits against the disk Q, has a peripheral flange, so that when the two disks are fitted together a chamber is formed for the coiled spring, the free end $q$ of which is inserted in one of the perforations. The two disks thus placed together are held upon the exterior of the face-plate by the screw $r$, which passes centrally through the disks and is screwed into the boss or journal $p^3$ of the arm P, which is located within the head. When the several parts are thus arranged the spring $p$ within the head will act to throw the curved arm against the roller carried by the needle-bar, and the convolute spring of the take-up will cause the lip $Q^2$ of the arm Q to press the take-up arm away from the guides S. By the above means the tension of the take-up spring can be readily varied by simply shifting the spring in the series of holes in the disk which carries the take-up arm.

The operation of the take-up device, being the same as fully set forth in my former patent, need not be herein described.

Figure 5:
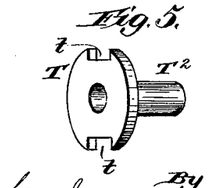
Fig. 5 shows a disk or collar forming part of the clutch mechanism.

As a means for winding up the bobbin, I provide the following arrangement of devices: On the rear end of the shaft, outside of the flanged bearing $b$, I secure a sleeve having at its inner end a disk, T, which sets up closely to the flange of said bearing. This disk, which is best shown at Fig. 5, has two or more notches, $t$, in its periphery, and forms in conjunction with a pair of lugs upon the sheave or driven pulley T′, a clutch mechanism.

Figures 2, 3, 4:
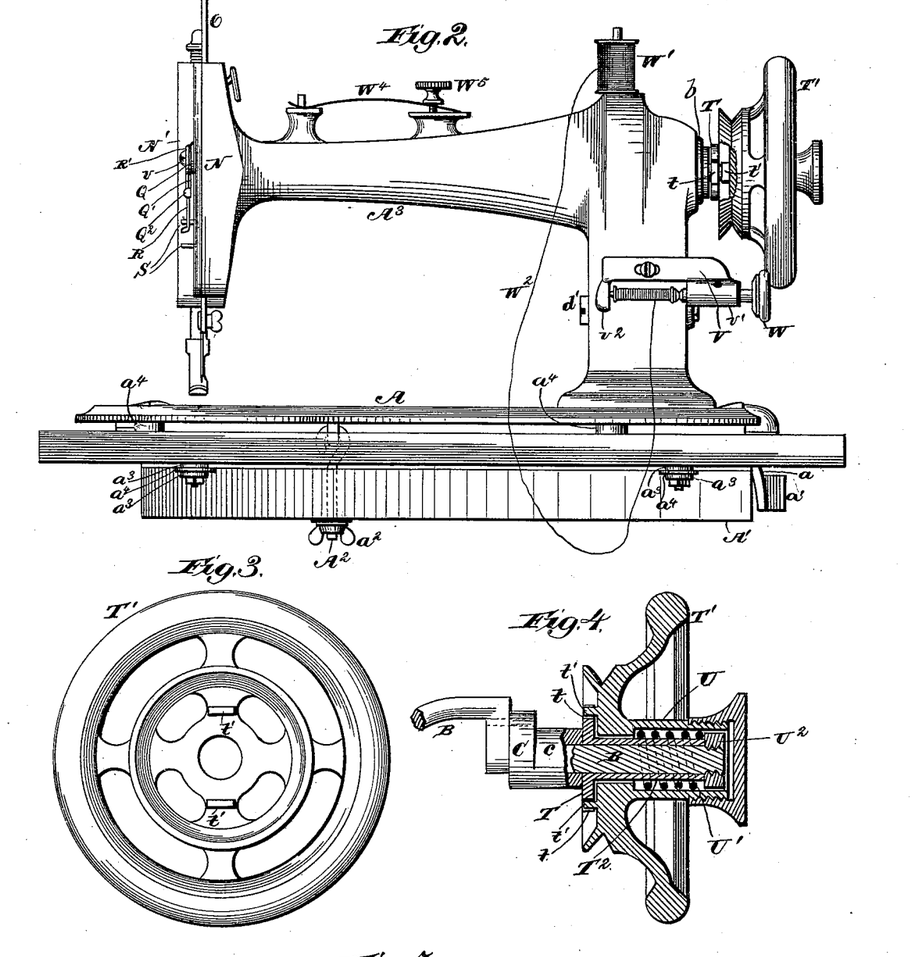
Fig. 2 is a side elevation thereof.
Fig. 3 shows the hand-wheel and driven pulley.
Fig. 4 is a section through the hand-wheel and driven pulley mounted on the driving-shaft, and illustrates the clutch mechanism.

As a means for maintaining the driven pulley in clutch with the driving-shaft, the hand or balance-wheel T′, which carries the driven pulley, has a hub, U, having a greater internal diameter for a portion of its length than the sleeve $T^2$, which fits upon the driving-shaft, and within the space thus left between the hub and the sleeve a coiled spring, U′, is arranged, which at its outer end abuts against a nut, $U^2$, screwed upon the end of the driving-shaft, and which at its inner end presses against a shoulder in the hub. Thus by drawing the hand-wheel back against the spring-pressure, the driven pulley will be unclutched from the shaft. On one side of the vertical portion of the goose-neck is located a bracket, V, which is preferably adjustably secured thereon. This bracket affords a tubular bearing, $v'$, for the shaft of a friction-wheel, W, and also a bearing, $v^2$, for one of the journals of a bobbin. The shaft of wheel W is capable of both a rotary and a sliding movement in its bearing, so that to place a bobbin in position for winding the shaft can be extended toward the hand-wheel and the bobbin journaled in the bearing $v^2$, and the end of the shaft, which will be formed so as to provide a suitable bearing for one of the bobbin-journals. When thus placed, as in Fig. 2, the hand-wheel must be drawn out and the driven pulley unclutched, in which extended position they will be maintained by the friction-wheel W, against which the hand-wheel will be maintained in frictional contact by the spring U′. Power can then be applied, and while the hand-wheel and driven pulley will rotate and drive the wheel W of the bobbin-winder the driving-shaft of the machine will remain still. It will thus be seen that it is necessary to have the bobbin journaled in position for winding in order to keep the pulley out of gear with the shaft. W′ indicates a spool placed upon the top that is fixed upon the top of the goose-neck, and $W^2$ the thread running from the spool to a bobbin upon which the thread is represented as being wound.

The tension device proper of the needle-thread is arranged upon the goose-neck and constructed in a similar manner to that embraced in my said former patent. As shown, it consists of the spring-plate $W^4$, supported upon lugs, a set-screw, $W^5$, passing through one end of the plate, and a split stud passing up through the opposite open end of the plate. This device, however, does not require further description or illustration.

From the foregoing it will be seen that I effect an improvement in actuating the shuttle, so that from a simple cranked driving-shaft located above the bed-plate I can, by the aid of two levers and without lost motion, effect a varied motion of the shuttle, causing it to decrease its speed while the loop is being taken over the shuttle; or by a slight change in the cam-slot the shuttle could be stopped and then started again; also, that the speed of the shuttle is increased or the shuttle is started as soon as the loop has been taken off, thus enabling the shuttle to arrive at its first starting-point in the race as soon as the needle has attained its greatest height; also, that the shuttle is poised or held loosely by the carrier while the loop is being taken off; but as it approaches the end of the race it is gradually gripped by the carrier, so that it will not be thrown in the carrier. Moreover, I provide a comparatively noiseless machine, and by hinging the bed-plate and providing the lug and fastening-screw the bed-plate can be fastened down over the drip-pan, or it can be readily detached altogether.

In conclusion, I will observe that under my arrangement of devices a uniform stitch is obtained at variable rates of speed; also, that the shuttle-race is regularly curved, and not irregularly curved, as in some prior instances, the shuttle being clamped gradually as it approaches either end of the race, so as to prevent rattling and noise. It will also be obvious that the mechanism could be employed for a straight as well as a regularly-curved shuttle-race.

Having thus described my invention, what I claim is—

1. The combination, in a sewing-machine, of the driving-shaft, mounted above the bed-plate and provided with a crank-bend, and an oscillating lever provided at its upper end with a cam-slot having its walls formed with the several curves, substantially as shown, and for the purpose described, said slot embracing the crank-bend of the shaft, and the lower end of said lever being loosely connected to the rear end of the shuttle-lever, whereby the herein-described varying movement is communicated to the shuttle from the driving-shaft, substantially as described.

2. As a means for causing the forward movement of the shuttle and the upward movement of the needle to stop at the same instant, for causing the needle and shuttle to begin their reverse movements simultaneously, and to cause a decrease in the speed of the shuttle while the needle takes the loop from off the heel of the shuttle, and then to effect an increase in the speed of the latter to complete the stitch, the combination of the vertical oscillatory lever, provided at its upper end with the herein-described cam-slot having its walls formed with the several curves herein shown and specified for effecting the irregular movement on the part of the lever requisite for effecting said movements on the part of the shuttle, the said slot embracing a crank-bend in the driving-shaft, which plays in the cam-slot to effect the varying movement of the shuttle, the horizontal oscillatory shuttle-lever being connected at one end to said vertical oscillatory lever, and at its remaining end provided with the shuttle-carrier, the needle-bar having a cross-head, and suitable intermediate connecting devices, substantially as described.

3. The combination, in a sewing-machine, of the oscillatory lever for operating the shuttle-lever, having an upper bearing-surface which acts against a crank, and a second lever supported by said oscillatory lever, and having a bearing-surface which acts from a reverse direction against said crank, the bearing-surfaces of these levers being maintained in contact with the crank by spring-pressure, whereby a clamping mechanism is provided and lost motion avoided, substantially as described.

4. The combination, in a sewing-machine, of the oscillatory lever for operating the shuttle-lever, having at its upper end the cam-slot embracing a crank portion of the driving-shaft, with a second lever having at its upper end a like cam-slot embracing the crank portion of the driving-shaft, these said levers being located side by side, and having a spring-resistance between them which shall normally throw one lever slightly in advance of the other, whereby a clamping mechanism is provided and lost motion avoided, substantially as described.

5. The combination, in a sewing-machine, of the oscillatory lever D, which actuates the shuttle-lever, and which is provided with a cam-slot embracing a cranked portion of the driving-shaft, with the lever $d^4$, mounted alongside said oscillatory lever and having a like cam-slot, and the spring $D^7$, located between the two levers and acting upon both, the said lever $d^4$ entering a hub in the oscillating lever D, substantially as described.

6. The combination, in a sewing-machine, of the shuttle driven in a regularly-curved race, with the shuttle-carrier adapted to clamp the shuttle at either extreme of the race and to hold the shuttle loosely at the point where the thread is taken over it, substantially as described.

7. The combination, with the shuttle-carrier, of means, substantially as described, for actuating the carrier so as to cause it to loosely support the shuttle at that point where the needle-thread is passing over the shuttle, and to automatically and gradually grip the shuttle as it reaches either end of the race, substantially as described.

8. A carrier for a sewing-machine shuttle, composed of a pair of jaws adapted to hold and support the shuttle, one of said jaws being rigid with an oscillatory lever, and the remaining jaw being pivotally connected to the rigid jaw, and also connected with a second lever, which is pivoted to the bed-plate in such position that as the carrier brings the shuttle in position to allow the thread to pass over the shuttle the said second lever will operate to release the pivoted jaw from the shuttle, and also to gradually close the pivoted jaw upon the shuttle as the carrier reaches either end of the race, substantially as described.

9. The combination, with a shuttle-carrier adapted to automatically grip and release the shuttle in the manner described, of the ring $e'$, fitted within an eye at one end of the lever $E^3$, and the screw $e^4$ passing through said ring into the bed-plate, and having its head binding solely upon said ring, whereby the pivotal center of the lever can be shifted, substantially as described.

10. The combination, with the table or support for a sewing-machine, of the bed-plate hinged to the said table or support, and formed at one of its hinge-corners with a lug adapted to engage with said support after the bed-plate has been raised, so as to hold the latter in an upright position, substantially as described.

11. The combination, in a sewing-machine, of the grease-pan provided with a short vertical tube, $A^4$, in its bottom, of the bolt $A^2$ passing up through said tube and hooked onto the hinged bed-plate, and a thumb-nut, $a^2$, fitted upon said bolt below the grease-pan, whereby the hinged bed-plate can be held down, substantially as described.

12. The combination in a sewing-machine, with the curved arm P, of the disk Q, carrying a coiled spring having one free end, and provided with an arm having a lip, $Q^2$, and the disk R' of the take-up arm, formed with a series of holes into which the free end of the spring is received, whereby the tension of the spring can be varied, substantially as described.

13. The combination, with the curved arm P and the expansion-spring $p$ acting thereon, of the disk Q, carrying a coiled spring having one free end, and provided with an arm, Q', having a lip at its outer end, the disk R' of the take-up arm, fitted against the disk carrying the spring, and having a series of holes into which the free end of the spring is engaged, the screw $v$, passing through both disks into a stud upon the curved arm, and the needle-bar having a roller located to act against the curved arm so as to compress the spring $p$, substantially as described.

In testimony whereof I have hereunto set my hand in the presence of two subscribing witnesses.

LEVIS H. DAVIS.

Witnesses:
JAMES L. NORRIS,
J. A. RUTHERFORD.